US012582221B1

(12) United States Patent
Daniels

(10) Patent No.: US 12,582,221 B1
(45) Date of Patent: *Mar. 24, 2026

(54) TOOL CLIP FOR POWER TOOLS

(71) Applicant: Nohlster LLC, Denver, CO (US)

(72) Inventor: Scott R. Daniels, Denver, CO (US)

(73) Assignee: Nohlster LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,047

(22) Filed: Nov. 20, 2023

Related U.S. Application Data

(63) Continuation of application No. 17/199,242, filed on Mar. 11, 2021, now Pat. No. 11,819,112.

(60) Provisional application No. 62/988,261, filed on Mar. 11, 2020.

(51) Int. Cl.
*A45F 5/02* (2006.01)
*B25F 5/02* (2006.01)
*A45F 5/00* (2006.01)

(52) U.S. Cl.
CPC .............. *A45F 5/021* (2013.01); *B25F 5/029* (2013.01); *A45F 5/1575* (2025.01)

(58) Field of Classification Search
CPC ......... B25H 3/003; B25H 3/006; A45F 5/021; A45F 2200/0575; A45F 2003/001; Y10T 24/1394; Y10T 24/1391; Y10S 224/904
See application file for complete search history.

(56) References Cited

U.S. PATENT DOCUMENTS

| | | | | | |
|---|---|---|---|---|---|
| 2,832,114 | A * | 4/1958 | Mead | G02C 11/00 D16/330 |
| 2,869,198 | A * | 1/1959 | Clevett, Jr. | A45F 5/021 24/3.12 |
| 4,754,528 | A * | 7/1988 | Lyons | A45F 5/021 24/3.12 |
| 4,964,225 | A * | 10/1990 | Waldherr | G01B 3/1084 33/768 |
| 5,038,985 | A * | 8/1991 | Chapin | G01B 5/0002 24/3.12 |
| 5,711,085 | A * | 1/1998 | Adams | G01B 3/1084 33/768 |
| 7,007,352 | B1 | 3/2006 | Hill | |
| 7,222,767 | B1 | 5/2007 | Yang | |
| 10,736,406 | B2 | 8/2020 | Hintze | |
| 11,819,112 | B1 * | 11/2023 | Daniels | A45F 5/021 |
| 2009/0001116 | A1 * | 1/2009 | Meng | B25H 3/003 224/666 |
| 2018/0279752 | A1 | 10/2018 | Woodhams et al. | |

* cited by examiner

*Primary Examiner* — Adam J Waggenspack
(74) *Attorney, Agent, or Firm* — Mahesh Law Group PC

(57) ABSTRACT

A tool clip for attaching a power tool to an item worn by a user. The tool clip includes a first piece having inner and outer parts joined by a bend. The tool clip further includes a second piece having inner and outer parts joined by a bend. The second piece includes a release tab which passes through a slot in the first piece to engage the first and second pieces with each other. The first and second pieces each have a mounting hole such that a screw can be passed through the mounting holes and into an existing hole in the power tool.

16 Claims, 14 Drawing Sheets

TOOL CLIP FOR POWER TOOLS

CROSS-REFERENCE TO RELATED APPLICATION

This application is a continuation of application Ser. No. 17/199,242, filed Mar. 11, 2021, which claims the benefit of Provisional Application No. 62/988,261, filed Mar. 11, 2020. The foregoing applications are hereby incorporated by reference.

TECHNICAL FIELD

The present disclosure generally relates to a tool clip for power tools, and more particularly to a tool clip for attaching power tools to an item worn by a user, such as a belt, pocket, or tool bag.

BACKGROUND

Workers who use various hand-held power tools often need to keep these tools near them for easy access but far enough out of the way to permit other tasks to be performed. Typically, workers utilize a device permitting the tools to be attached to the worker's belt, tool belt, tool/fastener pouches, or to the fabric hem of pant pockets. However, some existing devices hang loosely and can fall off when the worker moves. This can lead to injury, damage to the tool, or damage to property below. Other existing devices require an additional mating connection device to be secured to the worker ahead of time. These devices take up valuable space, are uncomfortable, pose a snag risk, and require an additional step and advance planning by the worker.

SUMMARY

Embodiments of the present disclosure can provide a tool clip that allows a power tool to be secured, without an additional mating device, to a worker's belt, pocket, or tool bag (e.g., tool/fastener pouch) whenever needed. The tool clip can permit a worker to attach and release the clip with one hand. In addition, the tool clip can possess a retaining force sufficient to attach the tool securely. Further, the tool clip can be inexpensive to manufacture while having the ability to work on a large number of different tools from a plurality of manufacturers.

The present disclosure provides a tool clip for power tools including one or more bent pieces of material attached to the power tool using a mounting screw.

The disclosure includes a tool clip for power tools for attaching the power tools to an item such as a belt, pocket, or tool bag. The tool clip can use a main clip having inner and outer members coupled together with a bend, and a retaining clip having inner and outer members coupled together with a second bend along with a release tab that passes through a center slot in the main tab to engage the two clips with each other. The combination of the two clips into a tool clip can be mounted by passing a mounting screw through a mounting hole of the main clip that is aligned with a mounting hole on the retaining clip. The mounting screw can be sized to engage an existing hole in the power tool.

The disclosure includes tool clips for attaching a power tool to an item worn by a user. According to an exemplary embodiment, a tool clip includes a main clip having inner and outer members coupled together with a first bend. The tool clip further includes a retaining clip having inner and outer members coupled together with a second bend. The retaining clip includes a release tab adapted to pass through a slot in the main clip to engage the main clip and the retaining clip with each other. A combination of the main clip and the retaining clip is mountable to the power tool by passing a mounting screw through a mounting hole of the main clip and a mounting hole of the retaining clip and into an existing hole in the power tool.

In the above embodiment, the item can be a belt, pocket, or a tool bag. The main clip can be formed by bending a single piece of metal into a u-shaped configuration. The mounting hole of the main clip can be located near an open end of the inner member of the main clip. The slot can be formed through the center of the main clip and traverse both the inner and outer members of the main clip. The inner member of the main clip may include a tiered set of bends. The retainer clip can be formed by bending a single piece of metal into a u-shaped configuration. The mounting hole of the retainer clip can be located near an open end of the inner member of the retainer clip. The mounting screw can be tightened against the power tool such that the main clip and the retaining clip are held together at the location of the mounting holes, creating a pivot point against which the retaining clip may move against the main clip. The retaining clip can include a slot disposed in the center of the outer member of the retaining clip. The tool clip can further include a holding tab disposed at the edge of the retaining clip's slot and adapted to engage with the main clip. The release tab can be adapted to move the retaining clip away from the outer member of the main clip to create a gap between the retaining clip and the main clip.

According to another exemplary embodiment, a tool clip is a one-piece tool clip including a main clip and a retainer clip cut from a single piece of metal. The main clip and the retainer clip join at the top of a center slot through which a release tab is passed. A hole for mounting the main clip to the power tool is disposed at the top of an inner part of the main clip. The release tab is adapted to move the retaining clip away from an outer part of the main clip to create a gap allowing for insertion or removal of the item.

In the above embodiment, the retaining clip can include first and second bends. A weakening slot may be formed at the point the main clip and the retainer clip join.

According to another exemplary embodiment, a tool clip includes a first piece including an inner part and an outer part joined together by a first bend. The first piece includes a first opening traversing both the inner part and the outer part. The tool clip further includes a second piece including an inner part and an outer part joined together by a second bend. The second piece includes a second opening with a holding tab at the edge of the second opening. The second piece also includes a release tab at an end thereof. The release tab is adapted to pass through the first opening to engage the first piece and the second piece together. The first and second pieces each have a mounting hole adapted to be aligned together with a screw passing therethrough into an existing hole in the power tool.

In the above embodiment, the second piece is made of a material having sufficient elasticity such that the outer part of the second piece moves away from the outer part of the first piece when the user applies pressure to the release tab, and moves back toward the outer part of the first piece when the user releases the release tab. The tool clip can further include a bit holder that is attachable to the second piece via a slot disposed at the second bend. The tool clip can include two holding tabs disposed at opposite sides of the second opening. The first and second pieces can be permanently held together by a grommet.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the present disclosure.

BRIEF DESCRIPTION OF THE DRAWINGS

Various ones of the appended drawings merely illustrate example embodiments of the present disclosure and should not be considered as limiting its scope.

DETAILED DESCRIPTION

Accordingly, embodiments of the present disclosure relate to a tool clip that can securely hold a power tool in place without requiring threading onto a worker's belt ahead of time. Further, it is possible to attach and release the tool clip easily using only one hand.

Figure 1A:
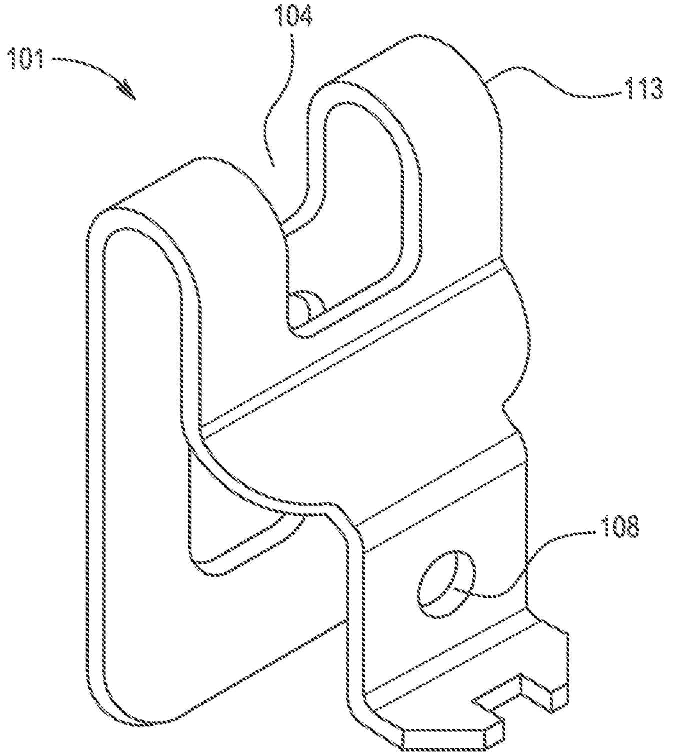
FIG. 1A shows a perspective view of a main clip according to one example embodiment.
Figure 1B:
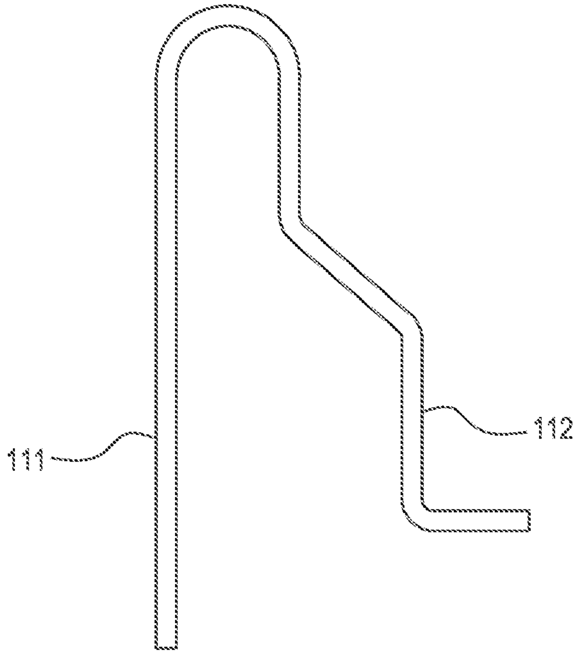
FIG. 1B shows a profile view of the main clip shown in FIG. 1A.

Turing to the drawings, FIGS. 1A and 1B represent one potential embodiment of a main clip for power tools for attaching the power tools to an item such as a belt, pocket, or tool bag according to the present disclosure. A main clip 101 is created by bending a single piece of material, preferably metal, into a u-shaped configuration as shown herein. The main clip 101 has an outer member 111 on one side of the bend 113 and a bent inner member 112 on the other side of the bend 113. A mounting hole 108 is located near an open end of the inner member 112. The main clip 101 may be mounted to a power tool using a screw passed through the mounting hole 108 and into a matching hole on the tool.

A center slot 104 is created as a slot through the center of the main clip 101 starting at the bend and traversing both the inner member 112 and the outer member 111. The center slot permits a retaining clip 202 to pass therethrough as shown below in regards to FIGS. 3A and 3B. The inner member 112 may possess a tiered set of bends to orient the space between the inner member 112 and the outer member 111 away from a plane parallel to the mounting hole 108. Thus, the clip 300 can be attached to a power tool a slight distance away from the tool for ease of use when attaching and releasing the clip 300 from a belt, pocket, or tool bag.

Figure 2A:
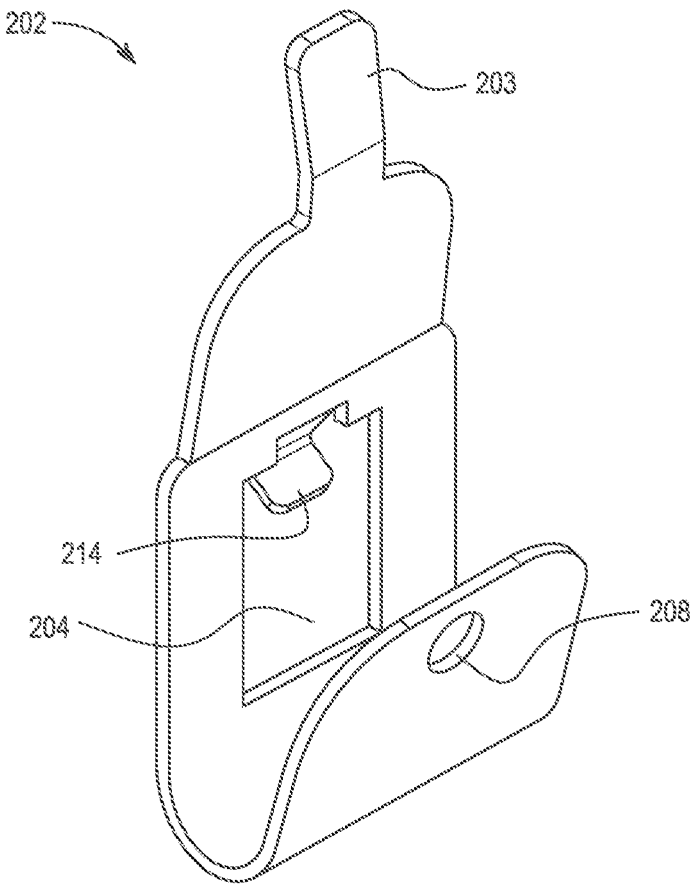
FIG. 2A shows a perspective view of a retaining clip according to one example embodiment.
Figure 2B:
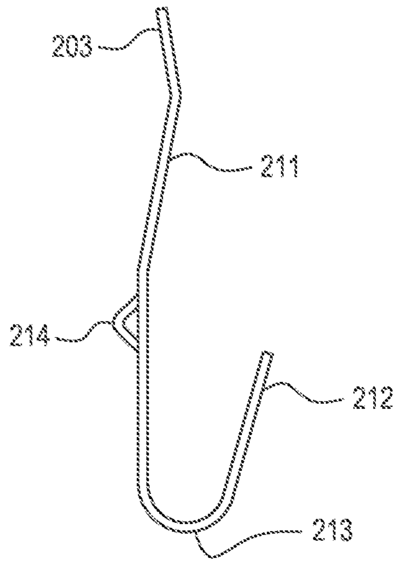
FIG. 2B shows a profile view of the retaining clip shown in FIG. 2A.

FIGS. 2A and 2B illustrate a retaining tool clip (e.g., a spring clip) for power tools for attaching the power tools to an item such as a belt, pocket, or tool bag according to the present disclosure. A retaining clip 202 is created by bending a single piece of material, preferably metal, into a u-shaped configuration as shown herein. The retaining clip 202 has an outer member 211 on one side of a bend 213 and a bent inner member 212 on the other side of the bend 213. A mounting hole 208 is located near an open end of the inner member 213. The retaining clip 202 may be mounted to a power tool using a screw passed through the mounting hole 208 and into a matching hole on the tool. The mounting hole 108 on the main clip 101 and the mounting hole 208 on the retaining clip 202 are placed adjacent to each other such that a mounting screw passes through towards the power tool. When the mounting screw is tightened against the power tool, the main clip 101 and retaining clip 202 are held together at the location of the mounting holes 108, 208 creating a pivot point against which the retaining clip 202 may move against the main clip 101.

A center slot 204 is created as a slot through the center of the outer member 211 of the retaining clip 202. The center slot 204 permits a holding tab 214 to be created. The holding tab 214 will engage the main clip 101 as shown below in regards to FIGS. 3A and 3B. When inserted into the main clip 101, the retaining clip 202 is forced inward against the natural bending strength of the retaining clip 202's material. This orientation will create a force holding the outer member 211 of the retaining clip 202 and the holding tab 214 against the outer member 111 of the main clip 101. The combination of the main clip 101 and the retaining clip 202 is discussed below.

Figure 3A:
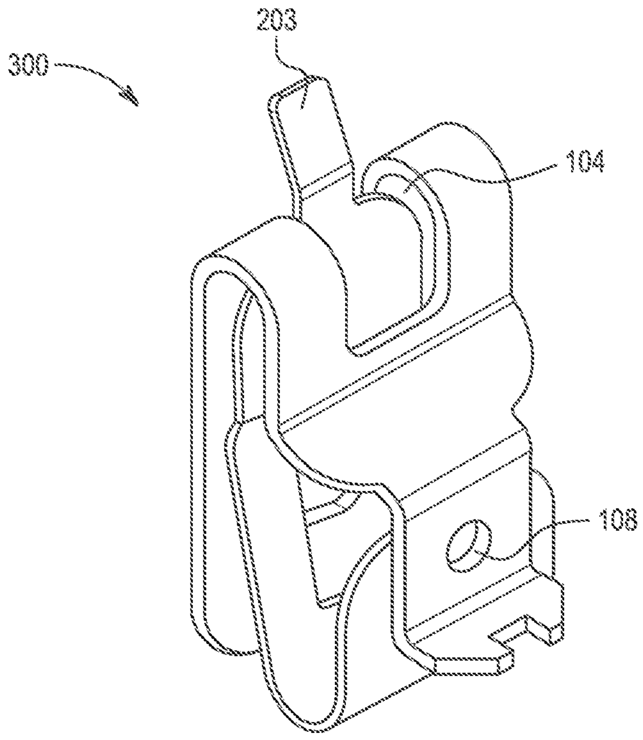
FIG. 3A shows a perspective view of a tool clip according to one example embodiment.
Figure 3B:
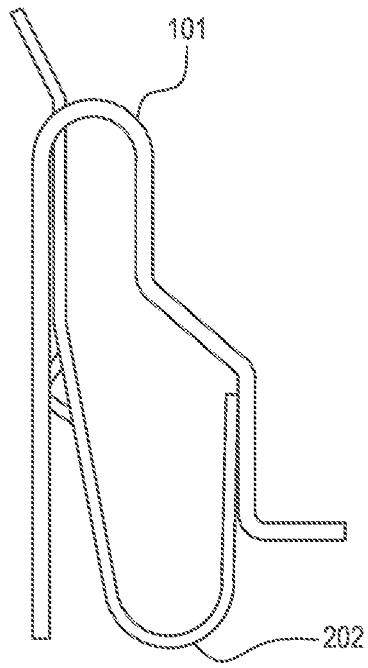
FIG. 3B shows a profile view of the tool clip shown in FIG. 3A.

FIGS. 3A and 3B illustrate two components for a complete tool clip for power tools for attaching the power tools to an item such as a belt, pocket, or tool bag according to the present disclosure. A complete tool clip 300 is shown when the retaining clip 202 is inserted into the inner portion of the main clip 101. The release tab 203 is shown after it has passed through the center slot 104 of the main clip 101.

A worker attaches the complete tool clip 300 to a belt, pocket, or tool bag by inserting a hook, loop, handle, or pocket fabric into the tool clip 300 between the main clip 101 and the retaining clip 202. As the belt or pocket material passes between the two clips, the retaining clip 202 is pushed away from the main clip 101 a sufficient distance to permit the material to move in between. The material may move down to the bottom of the main clip 101 at which point in time the retaining clip 202 engages the material to hold it in place. While the material is between the two clips, the retaining clip 202 exerts enough force to hold the clip in place. Because the clip is attached to a power tool, the power tool remains attached to the belt, pocket, or tool bag.

The worker uses the release tab 203 to move the retaining clip 202 away from the outer part of the main clip 101 creating a gap between the two clips into which a belt, pocket, or tool bag may be removed from the tool clip 300. When the release tab 203 is released by the worker, it will return to a closed position holding the retaining clip 202 against the main clip 101. The force generated by the bent retaining clip attempting to open to a wider distance will hold the two clips together.

Figure 4:
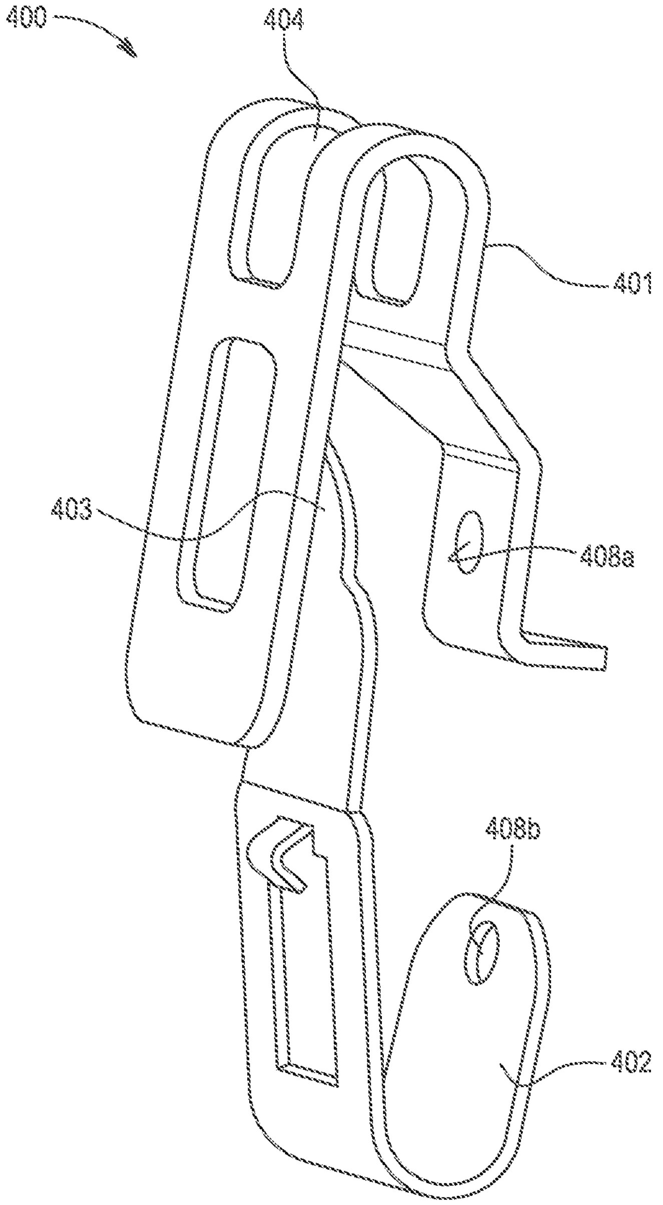
FIG. 4 shows an exploded view of a tool clip according to one example embodiment.

FIG. 4 illustrates an exploded isometric view of a two-piece main tool clip 400 for power tools for attaching the power tools to an item such as a belt or a tool bag according to the present disclosure. The main clip 401 is shown above the retaining clip 402 as the retaining clip is being installed. The release tab 403 will pass through a bottom slot 404 in the main clip. The two mounting holes 408*a-b* are aligned to permit a mounting screw (not shown) to attach both clips to the power tool and to hold the two clips in position relative to each other.

Figure 5A:
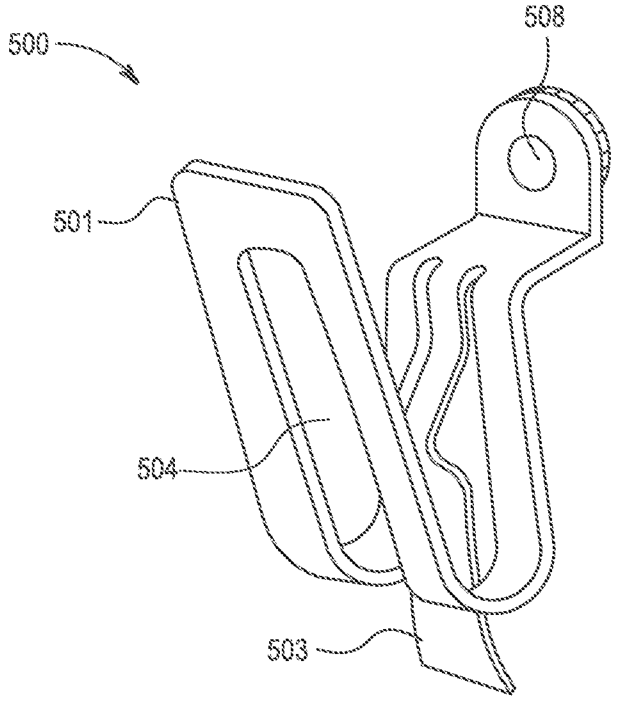
FIG. 5A shows a perspective view of a one-piece tool clip according to an example embodiment.
Figure 5B:
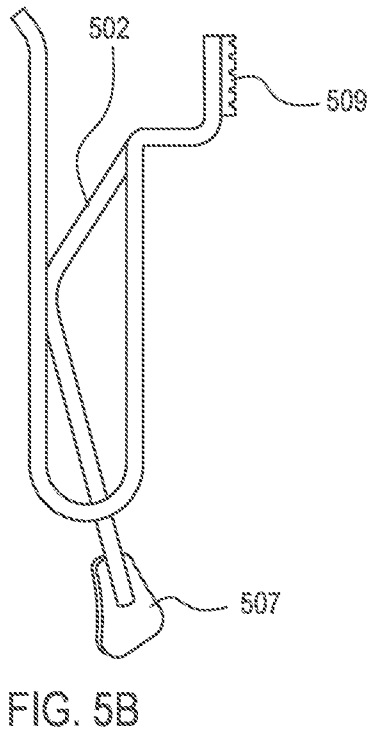
FIG. 5B shows a profile view of the one-piece tool clip shown in FIG. 5A.

FIGS. 5A and 5B illustrate an embodiment of a one-piece tool clip 500 for power tools for attaching the power tools to an item such as a belt, pocket, or a tool bag according to the present invention. The main clip 501 and the retaining clip 502 are cut from a single piece of material. The two clips join at the top of the center slot 504 through which the release clip 503 is passed. In an open or unlocked position, the retaining clip 502 moves away from the outer part of the main clip 501 to create space for a belt or tool bag to enter. Once inserted, the belt is held in place when the retaining clip 502 returns to be in contact with the main clip.

A mounting hole 508 is located on the top of the inner part of the main clip. A screw passes through the mounting hole 508 to attach the main clip 501 to a power tool (not shown). A tab grip 507 may be placed over an end of the release tab 503 once it has passed through the center slot 504 creating a grip to assist the worker in moving the release tab. The entire clip 500 is mounted to a power tool using a star washer or an external tooth washer 509 placed between the clip 500 and the power tool when an attachment screw is inserted to hold the clip in place and prevent rotation of the clip when used.

Figure 6:
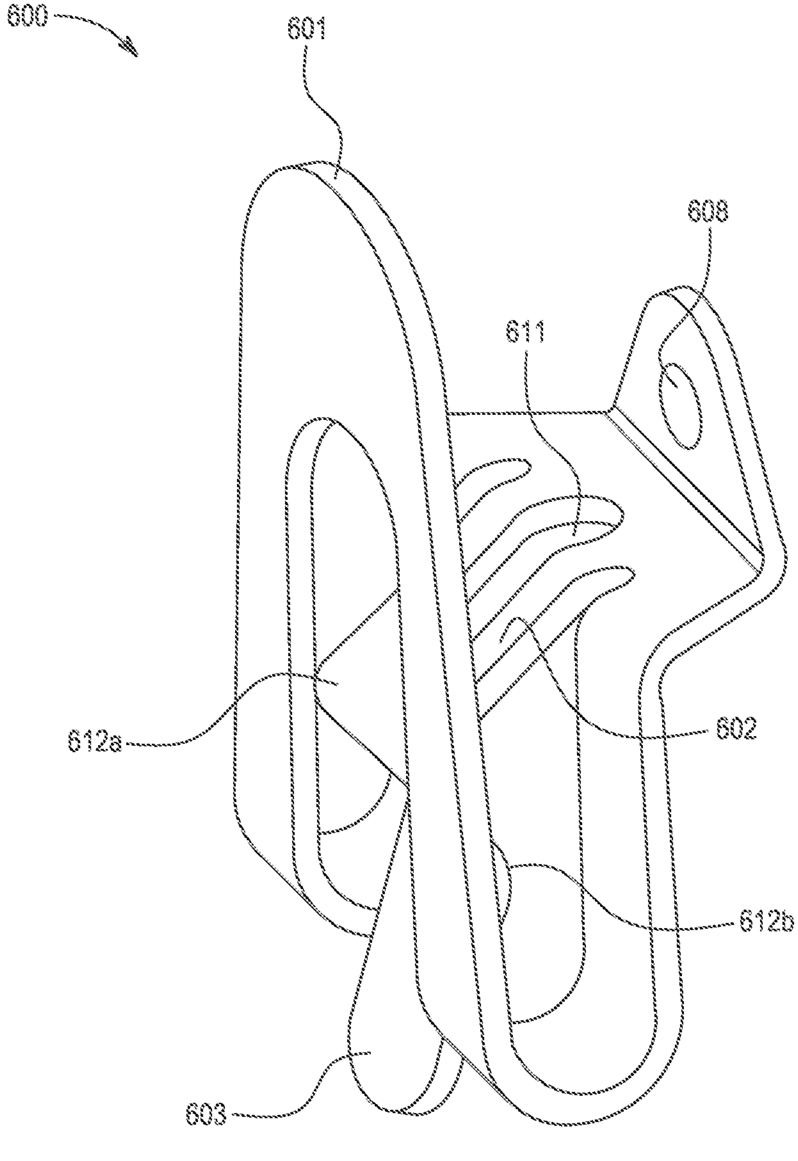
FIG. 6 shows a perspective view of a one-piece tool clip according to an example embodiment.

FIG. 6 illustrates an embodiment of a one-piece tool clip 600 that is made from a thicker metal. This embodiment of the tool clip 600 includes a main clip 601, a retaining clip 602 having a release tab 603 at its end. The retaining clip 602 includes two bends 612*a-b* to orient the retaining clip such that the first bend 612*a* engages with the main clip 601 when in use. The second bend 612*b* ensures that a worker's movement of the release tab 603 efficiently moves the above engagement point away from the main clip 601 when detaching a power tool from a pocket or similar attachment. The thicker embodiment of the tool clip 600 is made of metal that is 0.060 inches thick. The entire clip is made from steel and is heat treated to increase it positional memory allowing the retaining clip 602 to act as a spring. This heat treatment is well known to convert steel into spring steel. A weakening slot 611 is created at the point the main clip 601 and the retaining clip 602 join. This weakening of thicker metal is useful in controlling the amount of force needed to be applied to the release tab 603 to move the retaining clip 602 as needed.

Figure 7:
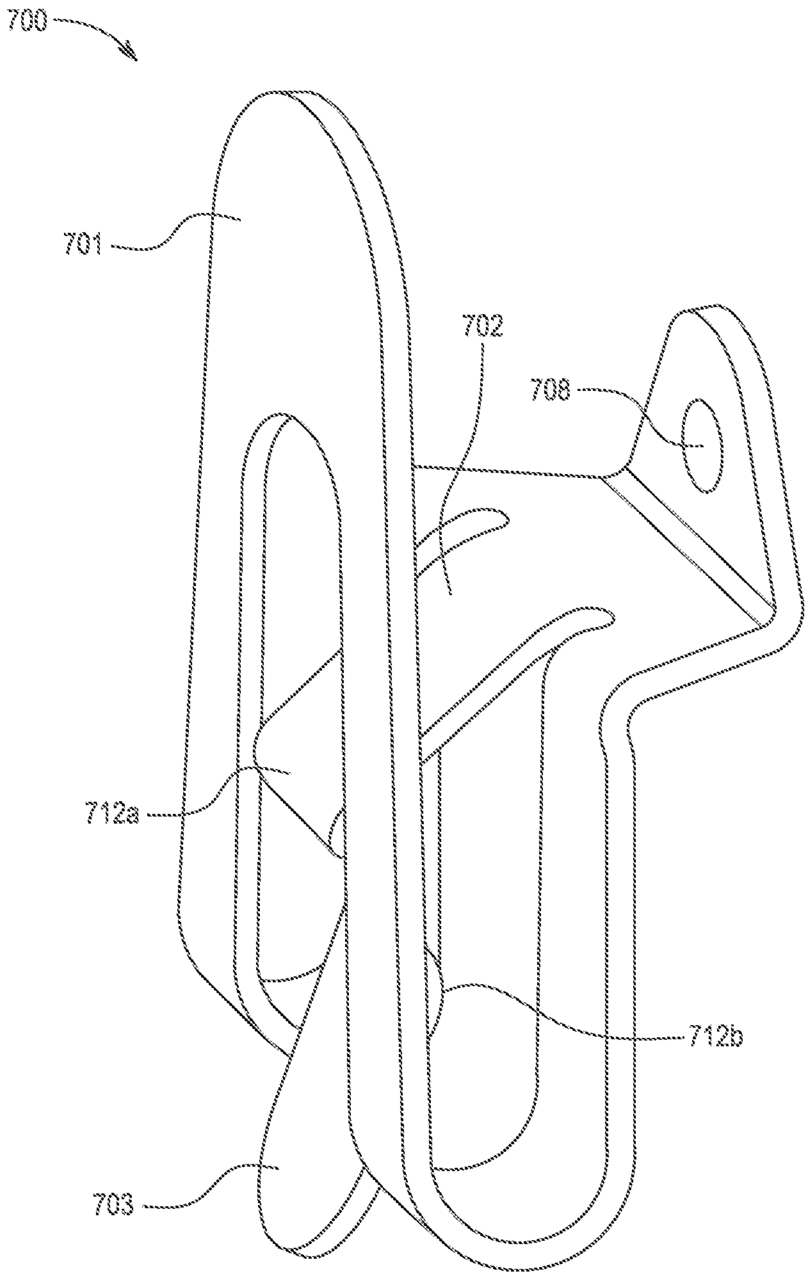
FIG. 7 shows a perspective view of a one-piece tool clip according to an example embodiment.

FIG. 7 illustrates an embodiment of a one-piece tool clip 700 that is made from a thinner metal. This embodiment includes a main clip 701 and a retaining clip 702 having a release tab 703 at its end. The retaining clip 702 includes two bends 712*a-b* to orient the retaining clip such that the first bend 712*a* engages with the main clip 701 when in use. The second bend 712*b* ensures that a worker's movement of the release clip 703 efficiently moves the above engagement point away from the main clip 701 when detaching a power tool from a pocket or similar attachment. The thinner embodiment of the tool clip 700 is made of metal that is 0.040 inches thick. The entire clip is made from steel and is heat treated to act as a spring as noted above. Because a thinner piece of steel has been used in this embodiment 700, a weakening slot 611 is not needed.

Figure 8A:
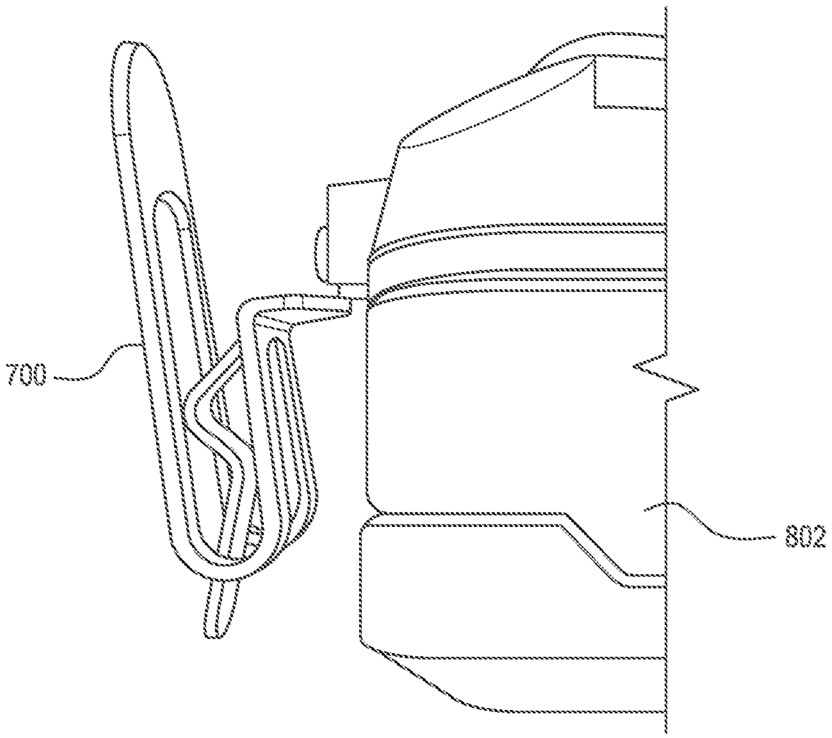
FIG. 8A shows a perspective view of a one-piece tool clip mounted on a power tool according to an example embodiment.
Figure 8B:
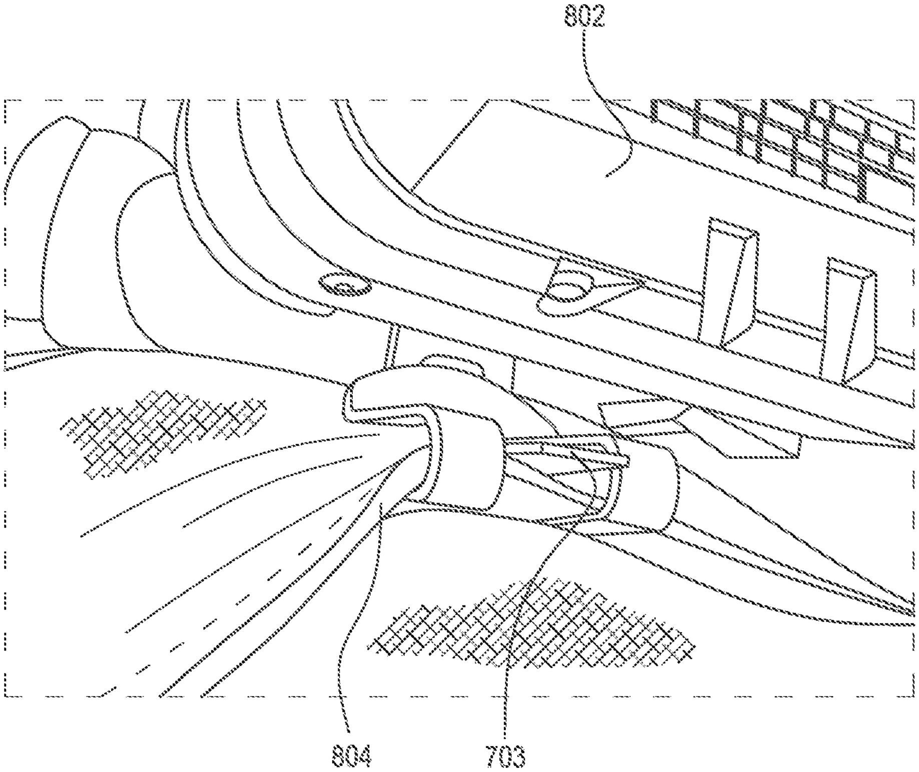
FIG. 8B shows a perspective view of a one-piece tool clip attached to a pocket of a user according to an example embodiment.

FIGS. 8A and 8B illustrate an embodiment of a tool clip 700 mounted on a power tool 802. This embodiment shows a complete clip with the main clip and the corresponding retaining clip that moves to permit a belt or bag to be attached inside the main clip. The release tab 703 is visible with the retaining clip extending outside the perimeter of the main clip. The release tab 703 can be used to remove the tool clip from a pocket. A worker may move the release tab 703 such that the retaining clip moves to permit a belt or tool bag to enter or leave the main clip. Once the belt or tool bag has been moved as desired, the release tab 703 is released and returns to a closed or locked position. FIG. 8B shows a tool clip and power tool when attached to a pocket as described above. As illustrated in this figure, the tool clip 700 is attached to a pocket hem 804. Of course, the tool clip can be attached in a similar manner to a different item such as a belt.

It will be appreciated that the tool clip of the present disclosure can include a center-mounted main tool clip for mounting on power tools having different manufacturers. Such a center-mounted clip is mounted on a center line mounting point relative to the base of the tool. Alternatively, the tool clip can include an off-center mounted main tool clip for mounting on power tools having different manufacturers. Such an off-center mounted clip is mounted on an off-center line mounting point relative to the base of the tool.

Figure 9A:
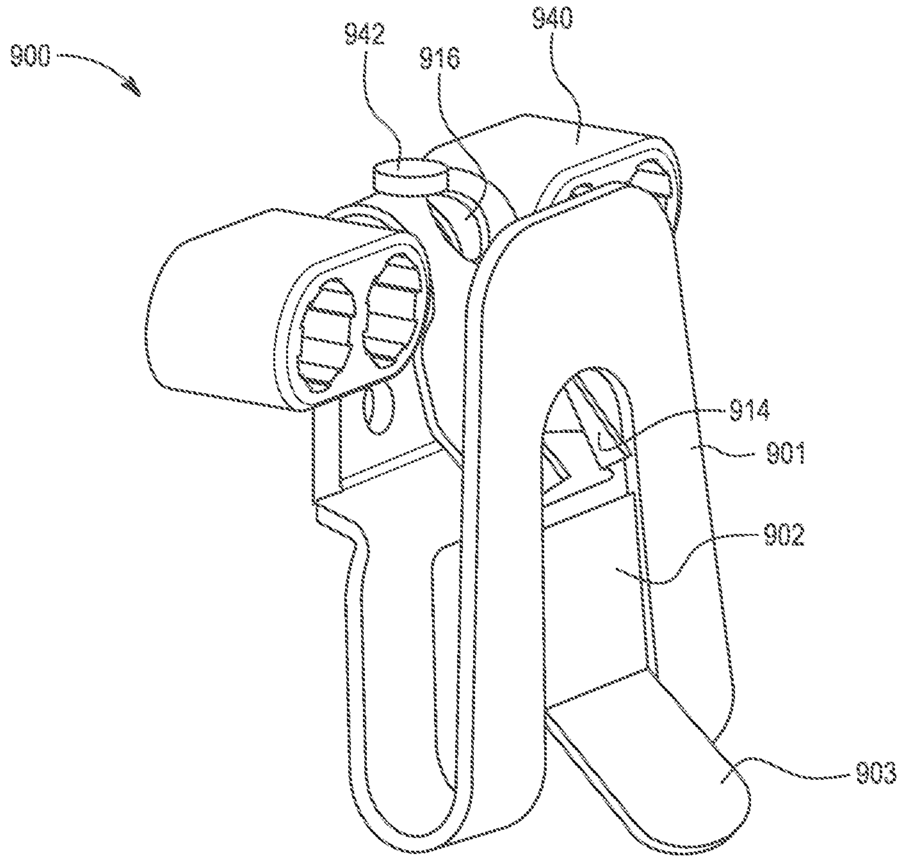
FIG. 9A shows a perspective view of a tool clip according to one example embodiment.
Figure 9B:
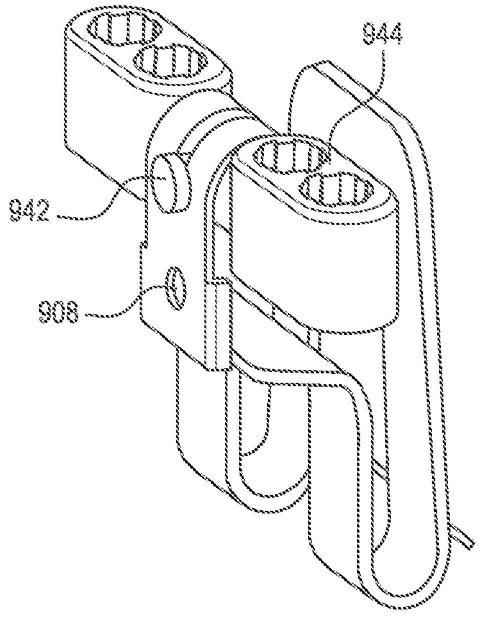
FIG. 9B shows a different perspective view of the tool clip shown in FIG. 9A.

FIGS. 9A and 9B show a tool clip 900 according to an example embodiment. The tool clip 900 includes a first piece 901 and a second piece 902. The first piece 901 includes an opening through which the second piece 902 passes. The first piece and the second piece are combined together such that a mounting hole of the first piece and a mounting hole 908 of the second piece are aligned together.

Each of the first and second pieces 901, 902 can be made from spring steel. For example, the first and second pieces can be made from carbon tool steel (e.g., SK7 steel grade) that has been heat treated to impart spring properties. The first piece 901 can be made thicker than the second piece so that the first piece has a greater stiffness. For instance, the thickness of the first piece 901 can be approximately at least two times the thickness of the second piece 902. As an example, the first piece 901 can have a thickness of 0.057 to 0.063 inches, and the second piece 902 can have a thickness of 0.03 inches.

The second piece 902 has elasticity such that when a worker applies pressure to a release tab 903, the second piece 902 moves away from the outer part of the first piece 901, and when the worker releases the release tab 903, the second piece 902 springs back toward its original position and exerts a force against the first piece 901. The first piece 901 does not necessarily need to be elastic or fully rigid; it has a range of elasticity that would work if produced out of metal.

There are other metals, grades of steels, and stainless steels that could be used for fabricating both the first and second pieces 901, 902. In addition, there are combinations of plastics, metals, carbon fibers, and glass fibers that would be used to produce an assembly having the same functionality. For example, the first piece 901 can be made from fiberglass reinforced heavy duty plastic.

The second piece 902 includes an opening having plural tabs or protrusions 914 disposed on opposite sides of the opening. The tabs 914 have a tapered shape and are adapted to better grip or hold material from an item such as a pocket when inserted into the tool clip 900. In effect, the tabs 914 create a barb that snags the material to hold the material more securely.

The tool clip 900 further includes a bit holder 940 for holding power or driver bits. This is particularly useful when the power tool to be attached is a hand-held power drill or impact driver. The bit holder 940 has cavities 944 into which various bits are inserted. The second piece 902 has a slot 916 for accepting a tab 942 of the bit holder. The tab is inserted into the slot and then the bit holder is rotated until it locks into place. FIG. 9A illustrates the bit holder 940 in mid-rotation. FIG. 9B illustrates the bit holder 940 once locked into position.

The bit holder 940 can be made of rubber, plastic or metal, and can include magnets to better hold the bits in place. If a bit holder is not desired, for example, in the case the power tool does not use bits (such as a pneumatic or battery powered finish or roofing nailer), then the bit holder can be omitted.

Figure 10:
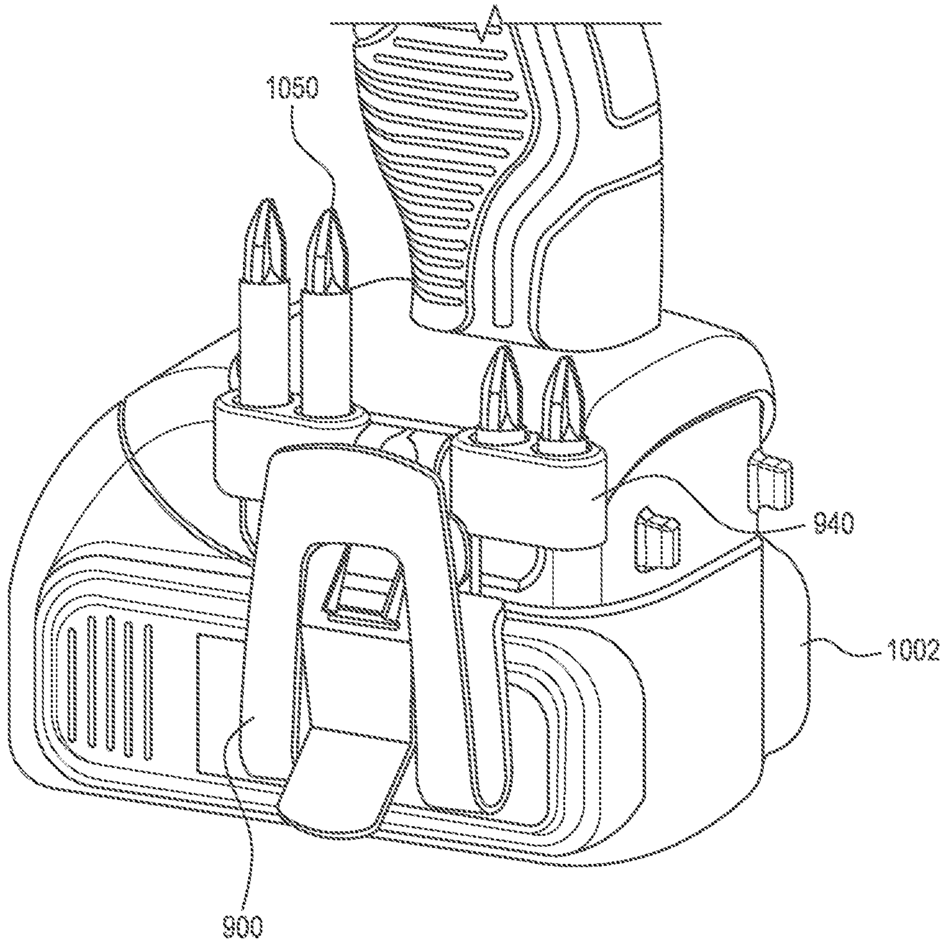
FIG. 10 shows a perspective view of a tool clip mounted on a power tool according to one example embodiment.

FIG. 10 illustrates the tool clip 900 mounted to a hand-held power tool 1002. As shown in this figure, various driver bits 1050 have been inserted into the bit holder 940.

FIGS. 11A to 11D illustrate a tool clip 1100 according to one example embodiment. The tool clip includes a first piece 1101 and a second piece 1102. The first piece 1101 includes an outer part 1111 and an inner part 1112 joined together by a first bend 1113. The first bend 1113 includes a first opening 1104 traversing both the outer part 1111 and the inner part 1112.

The second piece 1102 includes an outer part 1121 and an inner part 1122 joined together by a second bend 1123. The second piece includes a release tab 1103 at an end thereof. The release tab 1103 passes through the first opening 1104 to engage the first piece 1101 and the second piece 1102 together.

The first piece includes a mounting hole 1108 and the second piece includes a mounting hole 1118. The mounting holes 1108 and 1118 are aligned together and a screw 1130 passes through both mounting holes and into an existing hole in the power tool. A washer 1132 may be used optionally with the screw 1130. The second piece 1102 includes plural tabs 1170 disposed at an end thereof, on opposite sides of the hole 1118. Thus, when the tool clip is mounted, a portion of the inner part 1112 of the first piece 1101 is disposed between the tabs 1170. This helps to prevent the first and second pieces from rotating relative to one another, thereby keeping the tool clip rigidly attached to the power tool.

The second piece 1102 is made of a relatively elastic material such that when pressure is applied to the release tab 1103 by a worker in a direction toward the power tool, the outer part 1121 of the second piece moves away from the outer part 1111 of the first piece. When the worker releases the release tab 1103, the outer part 1121 of the second piece moves back toward the outer part 1111 of the first piece to apply a force against the outer part 1111.

The second piece 1102 includes a second opening 1124 with plural holding tabs 1114 arranged on opposite sides of the second opening 1124. The plural holding tabs 1114 have a tapered shape with a decreasing thickness toward the second bend 1123. The tapered shape allows for an item to more easily pass over the holding tabs during insertion. Then, once the item has been inserted, the wide end of the tapered shape helps to prevent the item from sliding in the opposite direction out of the tool clip, at least until such time the worker unlocks the tool clip using the release tab 1103. As such, the tapered shape helps to achieve a stronger and more secure hold of the item.

Figure 11A:
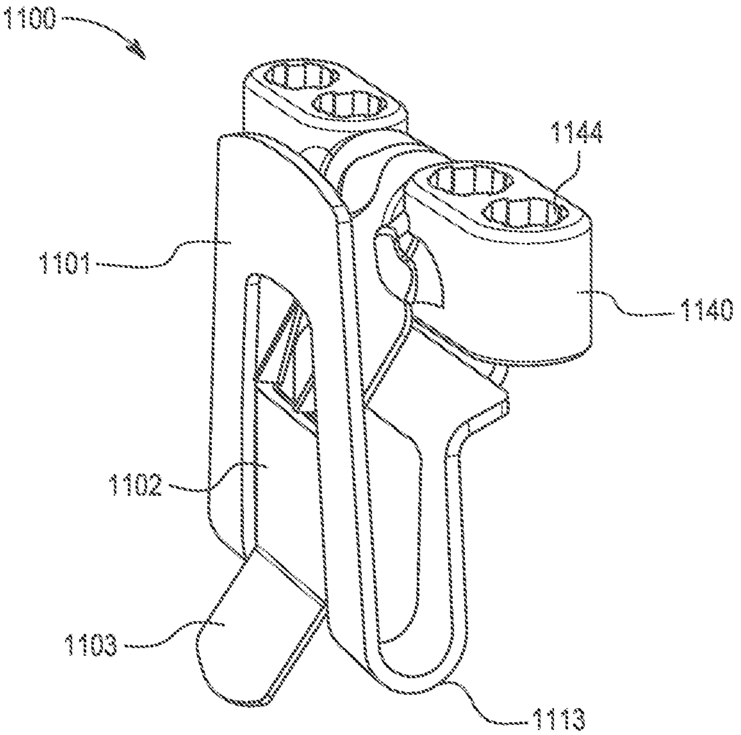
FIG. 11A shows a perspective view of a tool clip according to one example embodiment.
Figure 11B:
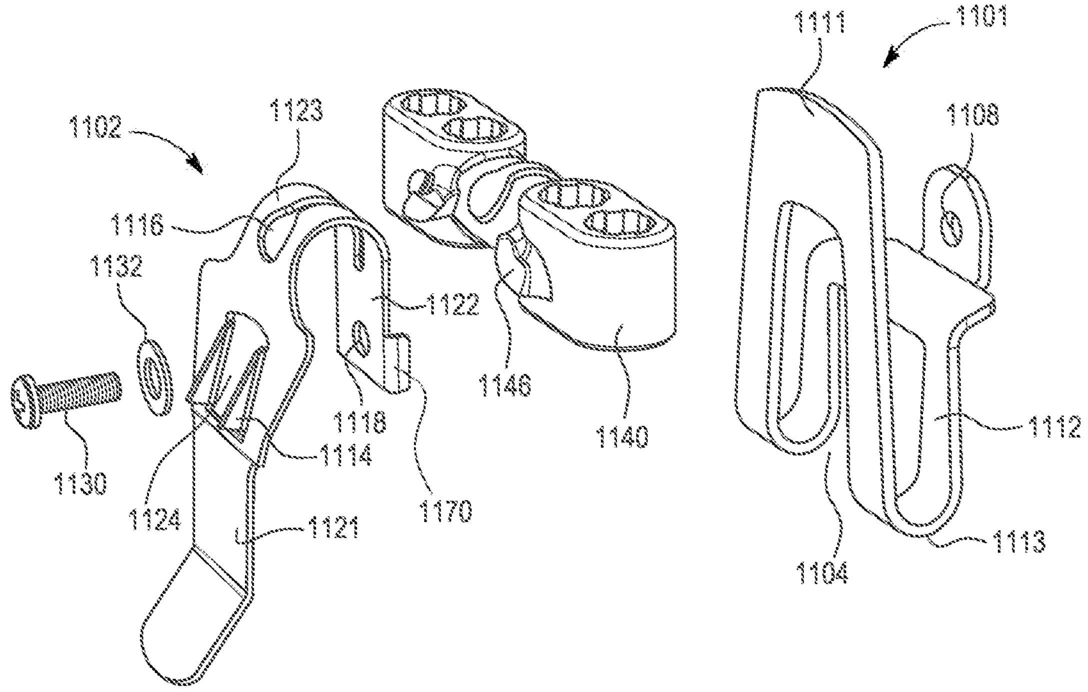
FIG. 11B shows an exploded view of the tool clip shown in FIG. 11A.
Figure 11C:
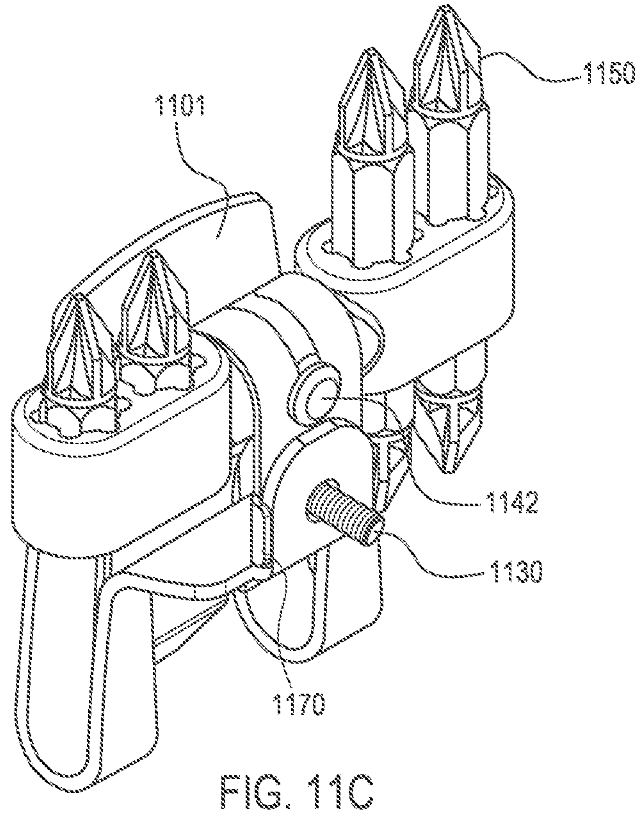
FIG. 11C shows a different perspective view of the tool clip shown in FIG. 11A with the inclusion of driver bits.
Figure 11D:
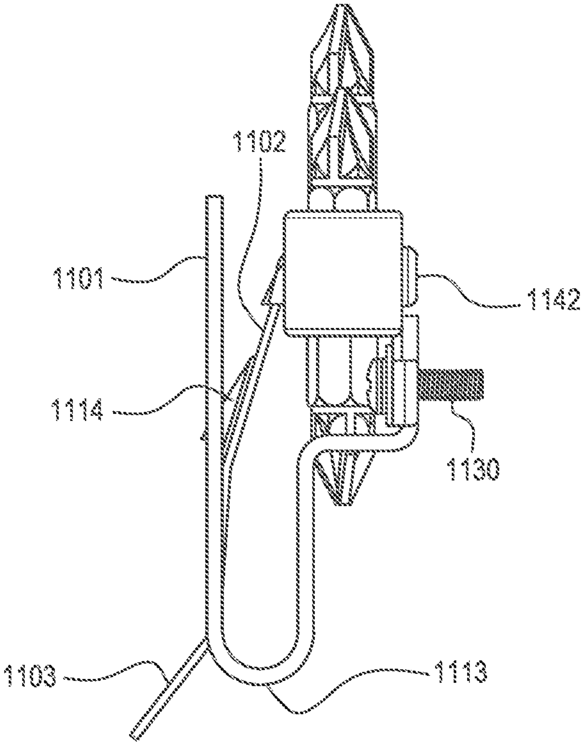
FIG. 11D shows a different perspective view of the tool clip shown in FIG. 11A with the inclusion of driver bits.

In addition, as shown in FIG. 11A, the plural holding tabs 1114 extend into the first opening 1104 when the tool clip 1100 is in a closed or locked state. Accordingly, when an item such as a pocket is inserted into the tool clip 1100, the plural holding tabs 1114 can push material from the pocket toward and/or into the first opening 1104, which results in a tighter grip of the pocket material.

The tool clip 1100 also includes a bit holder 1140 with cavities 1144 into which bits 1150 can be inserted. The bit holder has a tab 1142 which is inserted into a slot 1116. The bit holder 1140 is then rotated to lock it in place, along the same lines as described with respect to FIGS. 9A and 9B. The bit holder 1140 includes raised or protruding portions 1146 which are arranged to abut against opposite sides of the second bend 1123 and/or the outer part 1121 when the bit holder 1140 is locked into place. As such, the portions 1146 in effect hug the second piece 1102 so that the bit holder 1140 is secured more tightly into place.

Figure 12A:
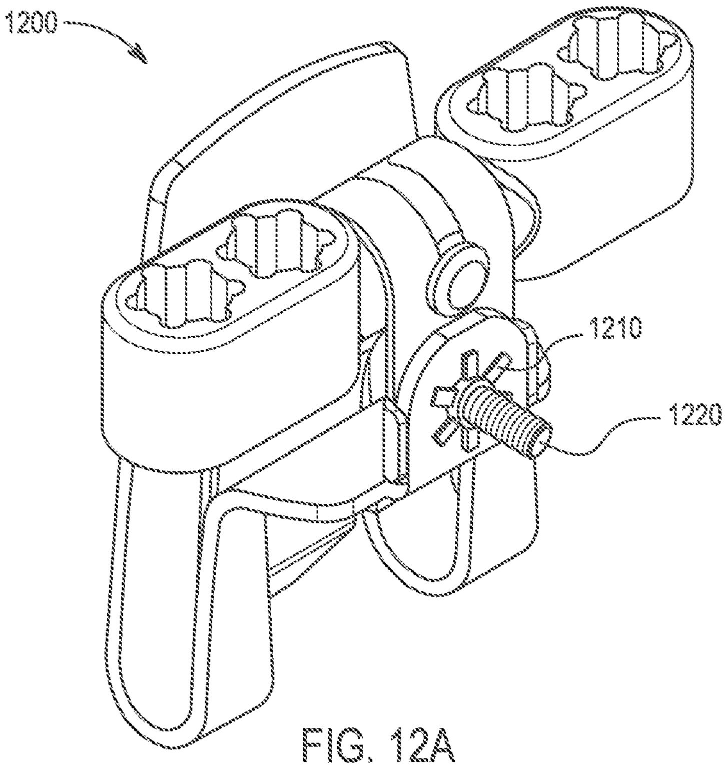
FIG. 12A shows a perspective view of a tool clip according to one example embodiment.
Figure 12B:
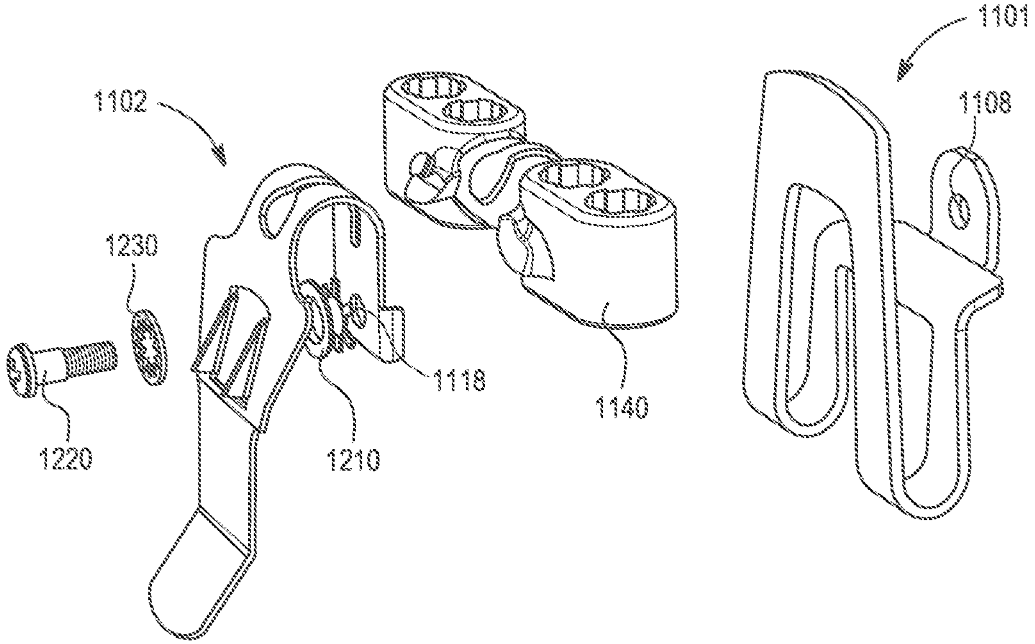
FIG. 12B shows an exploded view of the tool clip shown in FIG. 12A.

FIGS. 12A and 12B illustrate a tool clip 1200 according to one example embodiment. The first and second pieces 1101, 1102 are joined together with a grommet 1210 that gets formed in place to permanently hold the first and second pieces together. The grommet 1210 is installed through the mounting holes 1108, 1118 and is kept in place by a starred end on one side and a collared end on the other side. The starred end of the grommet 1210 can provide a toothed washer effect on the backside of the tool clip. The grommet 1210 is preferably made of metal but could be made from other suitable materials such as plastic.

The tool clip 1200 is mounted to a power tool by inserting a bolt 1220 through the installed grommet 1210 and into an existing hole in the power tool. An internal tooth lock washer 1230 can optionally be used with the bolt 1220. The grommet 1210 allows the first and second pieces 1101, 1102 to be held firmly together even after the tool clip is removed from a power tool. This can facilitate transfer of the tool clip from one power tool to another.

Figure 13A:
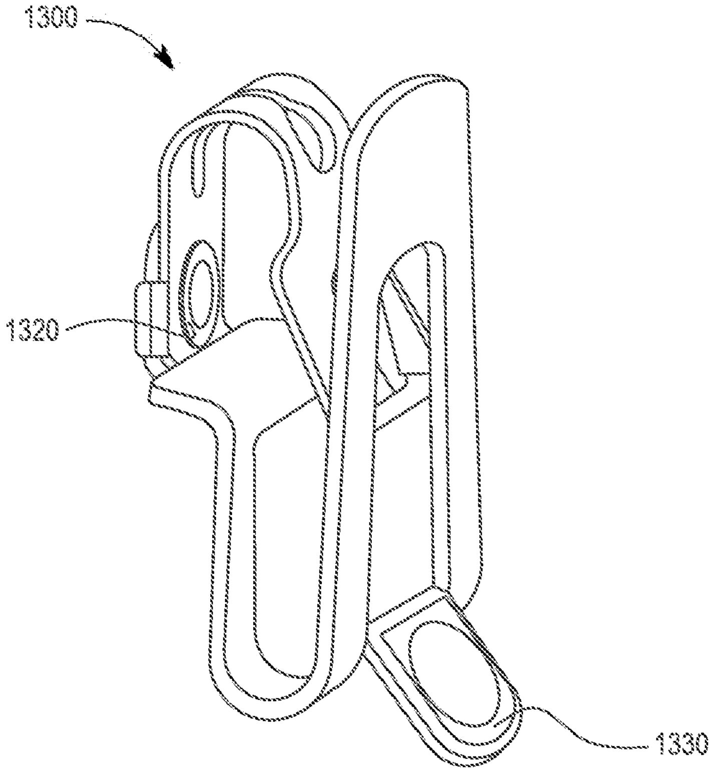
FIG. 13A shows a perspective view of a tool clip according to one example embodiment.
Figure 13B:
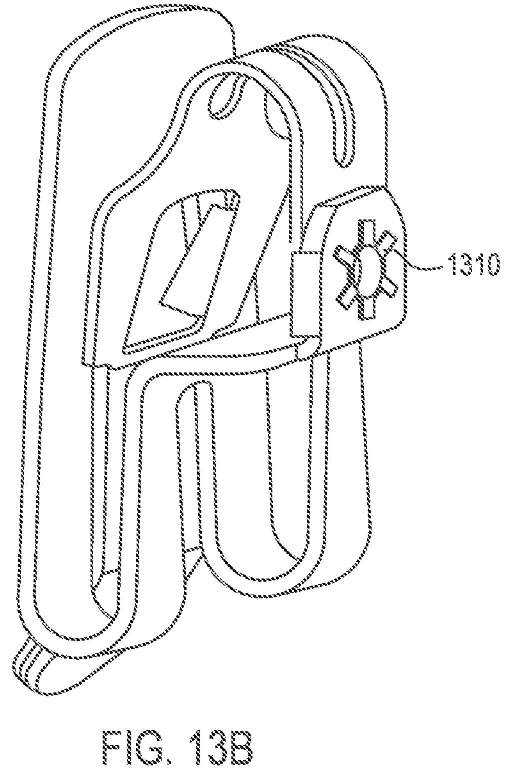
FIG. 13B shows a different perspective view of the tool clip shown in FIG. 13A.

FIGS. 13A and 13B illustrate a tool clip 1300 according to one embodiment of the disclosure. As shown in these figures, the tool clip includes a grommet with a starred end 1310 and a collared end 1320. Further, the tool clip includes a thumb grip 1330 placed over the release tab to assist the worker in moving the release tab. The thumb grip 1330 can include a logo graphic. For instance, the thumb grip 1330 can be a simple vinyl dipped cap with a pad printed logo. Alternatively, the thumb grip 1330 can be a cap with a molded-in logo, similar to how many rubber labels are made. The release tab can include small teeth or barbs (not shown) such that the thumb grip 1330 can be pressed into place and made difficult to remove.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. For example, it is to be understood that the disclosure contemplates that, to the extent possible, one or more features of any embodiment can be combined with one or more features of any other embodiment.

The invention claimed is:

1. A clip for attaching a device to an item worn by a user, comprising:

a first component having inner and outer portions coupled together with a first bend;

a second component having inner and outer portions coupled together with a second bend, wherein the first and second components are configured to engage with each other, and wherein at least one of the first and second components comprises an aperture configured to receive a fastener for attaching the first and second components to the device, wherein the first component has an opening traversing the inner and outer portions of the first component, and wherein the second component comprises a release tab adapted to pass through the opening to engage the first component and the second component together.

2. The clip according to claim 1, wherein the first component is a main clip and the second component is a retaining clip.

3. The clip according to claim 1, wherein the first and second components are attachable to the device by passing the fastener through the aperture and into an existing aperture in the device.

4. The clip according to claim 1, wherein the item is a belt, pocket, or tool bag.

5. The clip according to claim 1, wherein the first component is formed by bending a single piece of metal into a u-shaped configuration.

6. The clip according to claim 1, wherein the aperture is disposed in the first component and is located near an open end of the inner portion of the first component.

7. The clip according to claim 1, wherein the inner portion of the first component comprises a tiered set of bends.

8. The clip according to claim 1, wherein when the fastener is tightened against the device, the first and second components are held together at the location of the aperture creating a pivot point against which the second component may move against the first component.

9. The clip according to claim 1, wherein the second component comprises a slot disposed in the center of the outer portion of the second component.

10. The clip according to claim 1, further comprising a holding tab disposed at an edge of the slot and adapted to engage with the first component.

11. The clip according to claim 1, wherein the release tab is adapted to move the second component away from the outer portion of the first component to create a gap between the first and second components.

12. The clip according to claim 1, wherein the second component comprises an opening with a holding tab at an edge thereof.

13. The clip according to claim 1, wherein the second component is made of a material having sufficient elasticity such that the outer portion of the second component moves away from the outer portion of the first component when the user applies pressure to the release tab, and moves back toward the outer portion of the first component when the user releases the release tab.

14. The clip according to claim 1, further comprising a bit holder that is attachable to the second component via a slot disposed at the second bend.

15. A clip for attaching a device to an item worn by a user, comprising:

a first component having inner and outer portions coupled together with a first bend;

a second component having inner and outer portions coupled together with a second bend, wherein at least one of the first and second components comprises an aperture configured to receive a fastener for attaching the first and second components to the device, wherein the first and second components are configured to engage with each other, wherein the first component comprises a first opening traversing both the inner and outer portions of the first component, and wherein the second component comprises a second opening with two holding tabs disposed at opposite sides thereof.

16. A clip for attaching a device to an item worn by a user, comprising:

a first component having inner and outer portions coupled together with a first bend, a second component having inner and outer portions coupled together with a second bend, wherein the first and second components are configured to engage with each other, wherein at least one of the first and second components comprises an aperture configured to receive a fastener for attaching the first and second components to the device, and wherein the first component comprises an opening extending continuously through the inner portion of the first component, the first bent portion, and the outer portion of the first component, the opening being bounded along its perimeter by a material of the first component, wherein the second component comprises a portion adapted to pass through the opening and, when actuated, to move at least a portion of the second component away from the first component.

* * * * *